(12) United States Patent
Sabard et al.

(10) Patent No.: US 12,252,615 B2
(45) Date of Patent: Mar. 18, 2025

(54) TRANSPARENT POLYMERIC COMPOSITION

(71) Applicant: Arkema France, Colombes (FR)

(72) Inventors: Mathieu Sabard, Serquigny (FR);
Philippe Blondel, Bernay (FR);
Benjamin Saillard, Serquigny (FR);
Frédéric Malet, Pierre-Benite (FR)

(73) Assignee: ARKEMA FRANCE, Colombes (FR)

( * ) Notice: Subject to any disclaimer, the term of this patent is extended or adjusted under 35 U.S.C. 154(b) by 661 days.

(21) Appl. No.: 17/286,118

(22) PCT Filed: Oct. 17, 2019

(86) PCT No.: PCT/FR2019/052459
§ 371 (c)(1),
(2) Date: Apr. 16, 2021

(87) PCT Pub. No.: WO2020/079371
PCT Pub. Date: Apr. 23, 2020

(65) Prior Publication Data
US 2021/0371653 A1    Dec. 2, 2021

(30) Foreign Application Priority Data
Oct. 17, 2018  (FR) ...................... 1859606

(51) Int. Cl.
| | | |
|---|---|---|
| C08L 77/06 | (2006.01) | |
| C08L 51/04 | (2006.01) | |
| C08G 69/36 | (2006.01) | |
| C08L 33/12 | (2006.01) | |
| C08L 53/00 | (2006.01) | |

(52) U.S. Cl.
CPC .............. *C08L 77/06* (2013.01); *C08L 51/04* (2013.01); *C08G 69/36* (2013.01); *C08L 33/12* (2013.01); *C08L 53/00* (2013.01); *C08L 2201/10* (2013.01); *C08L 2205/02* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 2010/0140846 A1 | 6/2010 | Montanari et al. | |
| 2013/0202831 A1* | 8/2013 | Chhun | C08L 77/06 428/36.9 |
| 2016/0369098 A1* | 12/2016 | Yasuda | C08K 7/14 |
| 2019/0300707 A1 | 10/2019 | Malet et al. | |
| 2020/0224027 A1* | 7/2020 | Zhang | C08L 77/00 |

FOREIGN PATENT DOCUMENTS

| | | |
|---|---|---|
| EP | 0471566 A1 | 2/1992 |
| EP | 1482011 A1 | 12/2004 |
| EP | 1595907 A1 | 11/2005 |
| JP | 2004346274 A | 12/2004 |
| JP | 2004352794 A | 12/2004 |
| WO | 2008006987 A1 | 1/2008 |
| WO | 2009153534 A1 | 12/2009 |
| WO | 2012042162 A1 | 4/2012 |
| WO | 2016071409 A1 | 5/2016 |
| WO | 2017198949 A1 | 11/2017 |

OTHER PUBLICATIONS

Polymer Blends, vol. 1 Chapter 5 (1978) pp. 185-187. (Year: 1978).*
International Search Report (PCT/ISA/210) and Written Opinion (PCT/ISA/237) mailed on Feb. 17, 2020, by the European Patent Office as the International Searching Authority for International Application No. PCT/FR2019/052459.

* cited by examiner

*Primary Examiner* — David J Buttner
(74) *Attorney, Agent, or Firm* — Boone IP Law

(57) ABSTRACT

A polyamide-based polymer composition including: a) 50% to 98% by weight of a transparent amorphous polyamide; b) 1% to 15% by weight of a polymer in the form of core-shell particles; and c) 1% to 15% by weight of a polyether block and polyamide block copolymer, wherein the polyether block and polyamide block copolymer has: as a 2 mm layer, a transmittance at 560 nm of 90% or more; and a refractive index that does not differ by more than 0.01 from that of the transparent amorphous polyamide and wherein the polymer in the form of core-shell particles has a refractive index that does not differ by more than 0.01 from that of the transparent amorphous polyamide. Also, a process for the manufacture of the composition, and the composition capable of being obtained by said process.

12 Claims, No Drawings

TRANSPARENT POLYMERIC COMPOSITION

TECHNICAL FIELD

The present patent application relates to a transparent polymer composition, useful in particular for the manufacture of optical articles, and also to a process for the manufacture thereof. It also relates to the use of said transparent polymer composition for the manufacture of optical articles, in particular by injection molding.

PRIOR ART

The advantageous properties of polyamides are known with regard to the manufacture of transparent articles such as spectacle frames, housings, motor vehicle accessories, surgical materials, packaging or sporting goods. In particular, their good mechanical properties, such as a high tensile strength and/or compressive strength and resistance to external attacks, notably with respect to heat, chemicals and UV radiation, and also their good transparency are appreciated.

However, the impact strength of polyamides is limited and may hamper their use in certain applications.

Application EP 3 215 568 A1 proposes a transparent composition having improved impact strength, in which a specific polymer in the form of core/layer particles (also referred to as core-shell particles) is added to the polyamide. The impact strength of the compositions exemplified is advantageous, but not sufficient for their use for particularly demanding applications (sports goggles, safety glasses, protective mask, etc.).

Furthermore, application WO 2012/042162 A1 proposes to use particular polyether and polyamide block copolymers (PEBAs), optionally with up to 70% by weight of a transparent amorphous polyamide, to manufacture transparent articles having improved impact strength. These compositions generally have insufficient mechanical properties for most optical applications, in particular in terms of stiffness.

SUMMARY OF THE INVENTION

One objective of the present invention is therefore to provide a polyamide-based transparent polymer composition having improved impact strength, while retaining or even improving the optical and mechanical properties.

Specifically, the present invention is based on the observation that the modification of an amorphous polyamide with a polymer in core/shell form and a polyether and polyamide block copolymer in combination makes it possible to optimize the impact properties, in particular at low temperature, and in particular down to −30° C., while retaining excellent optical and mechanical characteristics, in particular in terms of transmittance, haze value and stiffness.

Therefore, according to a first aspect, one subject of the invention is a polyamide-based polymer composition comprising:
  a) 50% to 98% by weight of a transparent amorphous polyamide;
  b) 1% to 15% by weight of a polymer in the form of core-shell particles; and
  c) 1% to 15% by weight of a polyether block and polyamide block copolymer, characterized in that said polyether block and polyamide block copolymer has: as a 2 mm layer, a transmittance at 560 nm of 90% or more and
  a refractive index that does not differ by more than 0.01 from that of the transparent amorphous polyamide,
and in that the polymer in the form of core-shell particles has a refractive index that does not differ by more than 0.01 from that of the transparent amorphous polyamide.

This polymer composition has, as a 2 mm layer, advantageously a transmittance at 560 nm of 80% or more, preferably 85% or more, advantageously 88% or more and very particularly 90% or more and a haze value of not more than 10%, preferably not more than 7%, preferably not more than 6% and very particularly not more than 5%.

Preferably, the polymer in the form of core-shell particles comprises no more than 10 mol % of aromatic monomers.

Advantageously, the transparent amorphous polyamide is chosen from the TMDT, TMDI, TMD18, TMD14, TMD12, TMD10, MPMDT, MPMDI, MPMD18, MPMD14, MPMD12, MPDM10, B10, B11, B12, B13, B14, B16, B18, B19, B20, B21, BI, P10, P11, P12, P13, P14, P16, P18, P19, P20, PI, P21, 11/BI, 11/BT, 12/BI, 12/BT, 11/B10, 12/B10, 11/P10, 12/P10, 11/B12, 12/B12, 11/P12, 12/P12, 11/B14, 12/B14, 11/P14, 12/P14, 11/B18, 12/B18, 11/P18, 12/P18, 6.10/BI, 6.10/BT, 10.10/BI, 10.10/BT, 6.12/BI, 612/BI, 1012/BI, 1012/BT, 610/PI, 610/PT, 1010/PI, 1010/PT, 612/PI, 612/PT, 1012/PI, 1012/PT, 610/B10, 610/B12, 610/B14, 610/B18, 1010/B10, 1010/B12, 1010/B14, 1010/B18, 1012/B10, 1012/B12, 1012/B14, 1012/B18, 610/P10, 610/P12, 610/P14, 610/P18, 1010/P10, 1010/P12, 1010/P14, 1010/P18, 1012/P10, 1012/P12, 1012/P14, 1012/P18, B10/P10, B12/P12, B14/P14 12/B I/BT, 11/BI/BT, 12/PI/PT, 11/P I/PT, 11/B10/BT, 11/B12/BT, 11/P10/PT, 12/B10/BI, 12/B12/BI, 12/P10/PI, 12/P12/PI, 12/B10/BT, 12/B12/BT, 12/P10/PT, 12/P12/PT, 11/B10/BI, 11/B12/BI, 11/P10/PI, 11/P12/PI, 11/P12/PT, 11/B10/B14, 11/P10/P14, 11/B12/B14, 11/P12/P14, 12/B10/B14, 12/P10/P14, 12/B12/B.4, 12/P12/P14, 11/B10/B12, 11/P10/P12, 12/B10/B12, 12/P10/P12, 11/P12/B12, 12/P12/B12, 11/P10/B10 and 12/P10/B10, 12/BI, 12/BT, B12, 11/B14 and 11/B10 polyamides.

According to a particularly preferred embodiment, the transparent amorphous polyamide is 11/B10. When it is the 11/B10 polyamide, the molar ratio of the aminoundecanoic acid relative to the number of moles of diamine/diacid forming the polyamide in the transparent amorphous polyamide is preferably between 0.01 and 0.5, preferably between 0.1 and 0.4, and more preferably between 0.2 and 0.3.

The transparent amorphous polyamide may be composed of a single polyamide, in particular which is amorphous, or comprise several polyamides as a mixture, in particular also one or more semicrystalline polyamides. When it is a mixture, it may be composed of amorphous polyamides alone or comprise limited amounts of semicrystalline polyamides.

The transparent amorphous polyamide may in particular comprise a minor proportion, typically up to 50%, preferably up to 40% and more preferably up to 30% by weight, relative to the weight of the finished amorphous polyamide, of at least one semicrystalline polyamide, for example an aliphatic polyamide.

Preferably, the polymer in the form of core-shell particles comprises a layer (A) comprising a polymer (A1) having a glass transition temperature $Tg_{A1}$ below 0° C. and a layer (B) comprising a polymer (B1) having a glass transition temperature $Tg_{B1}$ above 60° C. Advantageously, the polymer (B1) is a (meth)acrylic polymer. Preferably, the polymer (B1) comprises at least 80% by weight of C1 to C4 alkyl methacrylate monomer and/or of C1 to C8 alkyl acrylate monomers.

According to a second aspect, the invention relates to a process for manufacturing a polyamide-based polymer composition as described above, comprising the step of mixing:
a) 50% to 98% by weight of a transparent amorphous polyamide;
b) 1% to 15% by weight of a polymer in the form of core-shell particles; and
c) 1% to 15% by weight of a polyether block and polyamide block copolymer, characterized in that said polyether block and polyamide block copolymer has:
as a 2 mm layer, a transmittance at 560 nm of 80% or more, preferably 85% or more, advantageously 88% or more and very particularly 90% or more;
a refractive index that differs by 0.01 or less from that of the transparent amorphous polyamide and
in that the polymer in the form of core-shell particles has a refractive index that does not differ by more than 0.01 from that of the transparent amorphous polyamide.

Preferably, the polymer in the form of core-shell particles comprises no more than 10 mol % of aromatic monomers.

According to a third aspect, the invention relates to a polymer composition capable of being obtained by said process.

According to a fourth aspect, the invention relates to the use of said polymer composition for the manufacture of transparent articles by injection molding.

Lastly, according to a fifth and final aspect, the invention relates to an article comprising said composition, in particular in at least one part or one layer. Such an article may be in particular a molded object, a sheet, a profiled element, a tube, a hollow body or an optically variable filter or an optical lens, preferably an ophthalmic lens, particularly preferably an element with a spectral filter effect, e.g. in the form of a spectacle lens, a sunglasses lens, a corrective lens, an optical filter, inspection glasses, sport goggles or ski goggles, visors, safety spectacles, optical recording systems, flowmeters, rupture disks, screens, optical data storage, housings or parts of housings, especially for shaving appliances, epilation appliances, measuring devices, or a window in buildings or in vehicles, or is a decorative element or a structural element, e. g. in the form of a spectacle frame or spectacle earpieces, a toy, or in the form of a part of a sports shoe, or golf equipment, especially a golf ball, or a cover, in particular in the form of a cell phone case, a part of electronic equipment, storage media, infrared keys, portable recording devices, personal digital assistants, smartphones, a coating, in particular a packaging, of decorative items, or sports equipment, or a veneer, preferably in the automotive sector.

DESCRIPTION OF THE EMBODIMENTS

Definition of the Terms

The term "polymer composition" is understood to denote a macroscopically homogeneous mixture comprising one or more polymers. The term also covers such compositions composed of mutually immiscible phases dispersed at the micrometric scale.

The term "copolymer" is understood to denote a compound derived from the polymerization of at least two chemically different types of monomer, referred to as comonomers. A copolymer is thus formed from at least two different repeating units. A distinction is made between random, alternating and statistical chain copolymers, which are homogeneous materials, and block copolymers which have, owing to their heterogeneous structure, several glass transition temperatures.

The term "polyether block and polyamide block copolymer", also referred to as "PEBA" or "polyetheramide", is understood to denote block copolymers in the above sense, comprising polyamide blocks and polyether blocks. These polymers are commercially available; they are sold for example by the company Arkema France under the brand PEBAX®.

The term "monomer" should be taken in the context of polyamides in the sense of "repeating unit". Indeed, the case where a repeating unit of the polyamide consists of the combination of a diacid with a diamine is particular. It is considered that it is the combination of a diamine and a diacid, that is to say the diamine.diacid pair (in an equimolar amount), which corresponds to the monomer. This is explained by the fact that, individually, the diacid or the diamine is only a structural unit, which is not enough by itself to polymerize.

The term "amorphous polymer" is understood to denote polymers having an enthalpy of fusion, as measured by differential calorimetry during the second heating with a heating rate of 20° C./min, of at most equal to 30 J/g, in particular between 2 and 30 J/g or alternatively equal to 0 J/g.

The term "polymer in the form of core-shell particles" is understood to denote a polymer in the form of particles, which are generally spherical, having parts of different composition. These particles may be obtained by a multistep process in which particles, in particular spherical particles, are produced in a first step, which particles are, in a subsequent step, coated with a separate polymer that forms an envelope, also referred to as a shell.

The term "melting temperature" is understood to denote the temperature at which an at least partially crystalline polymer changes from a solid state to a viscous liquid state, as measured by differential scanning calorimetry (DSC) according to the standard NF EN ISO 11 357-3 with a heating rate of 20° C./min.

The term "glass transition temperature" or "Tg" is understood to denote the temperature at which an at least partially amorphous polymer changes from a rubbery state to a glassy state, or vice versa, as measured by differential scanning calorimetry (DSC) according to the standard NF EN ISO 11 357-2 with a heating rate of 20° C./min.

The term "transparent" is understood to denote a material having, for a plate with a thickness of 2 mm, a transmittance at 560 nm of greater than 80% and preferably greater than 90%.

The term "transmittance" is understood to denote the fraction of a luminous flux of a material in the form of a plate with a thickness of 2 mm for a given wavelength. Unless otherwise stated, the transmittance is measured on a Konica-Minolta CM-3610A spectrophotometer according to the standard ASTM D 1003-2011 B (Illuminant D65) on 100× 100 mm plates with a thickness of 2 mm, at 560 nm.

The term "haze value" is understood to describe the transparency of a material in terms of light scattering at an angle of greater than 2.5° from the normal observed following interaction of the light with inhomogeneities present in the material. Unless otherwise stated, the haze value was measured on 100×100 mm plates having a thickness of 2 mm, at a wavelength of 560 nm and using a Konica-Minolta CM-3610A spectrophotometer according to the standard ASTM D 1003-2011 B.

The term "impact strength or impact resistance" is understood to denote the impact energy absorbed in breaking a notched test specimen referred to the initial cross section of the test specimen at the notch according to Charpy with a V-shaped notch, measured in kJ/m² according to the standard ISO 179-1:2010/1 eA on a type 1 sample, 80 mm×10 mm×4 mm. Unless otherwise stated, the impact strength is measured at 23° C.

The term "refractive index" is understood to refer to the index measured according to the standard ISO 489:1999, using a wavelength of 590 nm, and at a temperature of 23° C.

The term "flexural modulus" is understood to denote the flexural modulus of the polymer composition measured according to the standard ISO 178:2010 on a sample with dimensions of 80 mm×10 mm×4 mm.

Transparent Amorphous Polyamide

According to the invention, the polymer composition comprises a major proportion of a transparent amorphous polyamide in the sense defined above.

It may be a polyamide or a copolyamide. Such polyamides are in particular described in documents EP 1 595 907 A1 and WO 09 153 534 A1.

In a first variant, the amorphous polyamide may be of formula A/XY in which A is an aliphatic repeating unit and XY is a repeating unit obtained from the polycondensation of at least one linear or branched aliphatic diamine, or of a mixture of two or more thereof and of at least one aliphatic dicarboxylic acid.

Preferably, the aliphatic repeating unit A is obtained from the polycondensation of an aminocarboxylic acid comprising from 9 to 12 carbon atoms. It may thus be chosen from 9-aminononanoic acid (denoted 9), 10-aminodecanoic acid (denoted 10), 11-aminoundecanoic acid (denoted 11) and 12-aminododecanoic acid (denoted 12); advantageously, the aminocarboxylic acid is 11-aminoundecanoic acid.

In a second variant, the aliphatic repeating unit A is obtained from the polycondensation of a lactam comprising from 9 to 12 carbon atoms. It may thus be chosen from decanolactam (denoted 10), undecanolactam (denoted 11) and laurolactam or lauryllactam (denoted 12); advantageously, the lactam is undecanolactam.

More particularly preferably, the repeating unit A is obtained from a single aminocarboxylic acid or a single lactam.

Nonetheless, it is entirely possible to envision using, to obtain this same unit A, a mixture of two or more aminocarboxylic acids, a mixture of two or more lactams, but also a mixture of one, two or more aminocarboxylic acids with one, two or more lactams.

The repeating unit XY is preferably a unit obtained from the polycondensation of at least one linear or branched aliphatic diamine, or of a mixture of two or more thereof and of at least one aliphatic dicarboxylic acid.

The diamine and also the dicarboxylic acid each comprise preferably from 4 to 36 carbon atoms and, advantageously, from 6 to 18 carbon atoms.

The aliphatic diamine used to obtain this repeating unit XY is preferably an aliphatic diamine which has a linear main chain comprising at least 4 carbon atoms.

This linear main chain can, where appropriate, comprise one or more methyl and/or ethyl substituents; in said configuration, the term "branched aliphatic diamine" is used. In the case where the main chain comprises no substituent, the aliphatic diamine is termed "linear aliphatic diamine".

Whether or not it comprises methyl and/or ethyl substituents on the main chain, the aliphatic diamine used to obtain this repeating unit XY comprises generally from 4 to 36 carbon atoms, advantageously from 4 to 18 carbon atoms, advantageously from 6 to 18 carbon atoms, advantageously from 6 to 14 carbon atoms.

When this diamine is a linear aliphatic diamine, it then corresponds to the formula $H_2N—(CH_2)_x—NH_2$ and can be chosen for example from butanediamine, pentanediamine, hexanediamine, heptanediamine, octanediamine, nonanediamine, decanediamine, undecanediamine, dodecanediamine, tridecanediamine, tetradecanediamine, hexadecanediamine, octadecanediamine and octadecenediamine. The linear aliphatic diamines that have just been mentioned may all be biobased within the meaning of standard ASTM D6866.

When this diamine is a branched aliphatic diamine, it can in particular be 2-methylpentanediamine, 2-methyl-1,8-octanediamine or (2,2,4 or 2,4,4) trimethylenehexanediamine.

The dicarboxylic acid may be selected from linear or branched aliphatic dicarboxylic acids.

When the dicarboxylic acid is aliphatic and linear, it can be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanedioic acid (18), octadecenedioic acid (18), eicosanedioic acid (20), docosanedioic acid (22) and fatty acid dimers containing 36 carbons.

The fatty acid dimers mentioned above are dimerized fatty acids obtained by oligomerization or polymerization of unsaturated monobasic fatty acids bearing a long hydrocarbon chain (such as linoleic acid and oleic acid), as described in particular in the document EP 0 471 566.

By way of example, the units XY may be chosen from polydecamethylene dodecanamide (PA 1012), polydecamethylene sebacanamide (PA 1010) and polydodecamethylene dodecanamide (PA 1212); advantageously the unit XY represents polydecamethylene sebacanamide (PA 1010).

The molar proportions of diamine and of dicarboxylic acid are preferentially stoichiometric.

Preferably, the amorphous polyamide comprises more than 50 mol % of an equimolar combination of at least one cycloaliphatic diamine and at least one aliphatic or aromatic dicarboxylic acid, having from 10 to 36 carbon atoms, preferably from 10 to 18 carbon atoms. Such polyamides specifically have a high transparency.

According to a preferred embodiment, the amorphous polyamide used comprises more than 70 mol %, preferably more than 80 mol %, preferably more than 90 mol %, preferably 100 mol % of an equimolar combination of at least one cycloaliphatic diamine and at least one preferably linear, aromatic or aliphatic dicarboxylic acid having from 10 to 18 carbon atoms.

The cycloaliphatic diamine may be chosen from: bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (abbreviated to BMACM or MACM or B), bis(p-aminocyclohexyl)methane (PACM), isopropylidenedi(cyclohexylamine) (PACP), isophoronediamine (IPD), 2,6-bis(aminomethyl)norbornane (BAMN), and mixtures thereof. Among these diamines, bis(3-methyl-4-aminocyclohexyl)methane (abbreviated to BMACM or MACM or B) is particularly preferred. Preferably, the amorphous polyamide is obtained with a single cycloaliphatic diamine.

At least one non-cycloaliphatic diamine may be included in the composition of the monomers of the polyamide, in a proportion of at most 30 mol % (% in moles) relative to the diamines of said composition. As non-cycloaliphatic diamine, mention may be made of linear aliphatic diamines such as 1,4-tetramethylenediamine, 1,6-hexamethylenediamine, 1,9-nonadiamine and 1,10-decamethylenediamine.

The C10 to C18 aliphatic dicarboxylic acid is preferably chosen from 1,10-decanedicarboxylic acid or sebacic acid, 1,12-dodecanedicarboxylic acid, 1,14-tetradecanedicarboxylic acid and 1,18-octadecanedicarboxylic acid. The dicarboxylic acid may optionally be at least partially branched by at least one C1 to C3 alkyl group (having 1 to 3 carbon atoms). Among these diacids, sebacic acid is particularly preferred. Preferably, the amorphous polyamide is obtained with a single diacid.

At least one non-aliphatic dicarboxylic acid may be included in the composition of the monomers of the polyamide, preferably in a proportion of at most 15 mol % relative to the dicarboxylic acids of the polyamides. The non-aliphatic dicarboxylic acid is preferably selected from aromatic diacids, in particular isophthalic acid (1), terephthalic acid (T), and mixtures thereof.

Preferably, the amorphous polyamides are formed essentially (more than 60 mol %, preferably more than 70 mol %, more preferably more than 80 mol % and in particular more than 90 mol %) from at least one XY unit chosen from B10, B12, B14, B16, B18, and mixtures thereof, so as to form random and/or block copolymers (copolyamides).

Said amorphous polyamides may optionally comprise less than 40 mol %, preferably less than 30 mol %, more preferably less than 20 mol % of at least one polyamide comonomer, that is to say a monomer having a composition different from said predominant equimolar combination defined above. Said at least one comonomer may be chosen from lactams, α,ω-aminocarboxylic acids and diamine.diacid combinations different from the one defined above, and mixtures thereof. In any event, said amorphous polyamides do not contain repeating units based on polyether blocks and are therefore different from PEBAs.

The lactam may be for example selected from caprolactam, oenantholactam and lauryllactam. Mention may for example be made, as α,ω-aminocarboxylic acid, of aminocaproic acid, 7-aminoheptanoic acid, 11-aminoundecanoic acid or 12-aminododecanoic acid. A preferred comonomer is a lactam or an α,ω-aminocarboxylic acid and among these in particular lauryllactam and 11-aminoundecanoic acid.

Examples of amorphous polyamides include in particular: the polyamide PA 12/MACMI (PA 12/3,3-dimethyl-4,4-diaminocyclohexylmethane, isophthalic acid), PA 12/MACMT (PA 12/3,3-dimethyl-4,4-diaminocyclohexylmethane, terephthalic acid), PA MACM12 (3,3-dimethyl-4, 4-diaminocyclohexylmethane, decanedicarboxylic acid or laurolactam), PA MC12 (PA12, 1,3-bis (aminomethyl)-cyclohexane), PA 11/B10, PA 11/B14, and PA B10.

Use may be made of the polyamides available on the market under the name Grilamid TR55® containing PA 12/MACMI, Grilamid TR90® containing PA MACM12 (manufactured by EMS Chemie), Trogamid CX® containing PA MC12 (manufactured by Evonik Degussa-Chemie), and Rilsan® Clear containing PA 12/MACMI/MACMT (manufactured by ARKEMA).

Preferably, the chosen amorphous polyamide is rigid, that is to say has an ISO flexural modulus >1300 MPa. Furthermore, the amorphous polyamide preferably has a glass transition temperature Tg above 75° C. and therefore does not deform at elevated temperature, at 60° C.

According to the invention, the polymer composition comprises from 50% to 98% by weight of transparent amorphous polyamide. Preferably, the composition comprises from 60% to 97% by weight, and in particular from 70% to 96% by weight, and very particularly from 80% to 95% by weight of transparent amorphous polyamide.

Polymer in the Form of Core/Shell Particles

In order to improve the impact strength, the polymer composition according to the invention further comprises, in addition to the amorphous polyamide, a polymer in the form of core/shell particles as defined above.

The polymer in the form of core/shell particles preferably has a refractive index similar to the amorphous polyamide, so as not to opacify the composition, which results in a higher haze value.

Preferably, the refractive index of this component does not differ from that of the transparent amorphous polyamide by more than 0.01, and more preferably 0.005 and very particularly 0.002.

The weight-average diameter of the core/shell particles as measured by transmission electron microscopy is generally between 20 nm and 500 nm, preferably between 20 and 350 nm, and very particularly between 20 and 300 nm.

Advantageously, the core/shell particles comprise a core (A) comprising a polymer (A1) having a glass transition temperature below 0° C. and a shell (B) comprising a polymer (B1) having a glass transition temperature above 60° C. Preferably, the polymer (A1) has a glass transition temperature below −5° C., preferably below −15° C. and very particularly below −25° C. Preferably, the polymer (B1) has a glass transition temperature above 70° C., in particular above 90° C. and in particular above 100° C.

These core/shell particles are obtained by a multi-step process, as described for example in patents EP 1 844 086 or EP 0 722 961. Generally, the polymer (A1) in the core (A) is made in a first step and the polymer (B1) in the shell (B) is made in a second or final step of the process. Between the core and the shell, there may be one or more intermediate layers obtained by additional intermediate steps.

Advantageously, the content of aromatic groups is limited in the core/shell particles. Thus, the polymer (A1) and the core (A) preferably comprise from 0 to less than 50% by weight of monomers containing aromatic groups. Likewise, the polymer (B1) and the shell (B) preferably comprise 0 to less than 50% by weight of monomers containing aromatic groups. It is particularly preferred for the polymer (B1) and the shell (B) to be essentially free of monomers containing aromatic groups.

The polymer (A1) preferably comprises at least 50% by weight of repeating units derived from isoprene or butadiene. Thus, the polymer (A1) may comprise isoprene or butadiene homopolymers, isoprene-butadiene copolymers, butadiene-styrene copolymers, and copolymers of isoprene with up to 98% by weight of one or more other vinyl monomers, for example styrene, an alkylstyrene, acrylonitrile, an alkyl (meth)acrylate, butadiene or a mixture thereof, provided that the polymer (A1) comprises less than 50% by weight of monomers containing aromatic groups.

The polymer (A1) in the core/shell particles may be crosslinked. The crosslinking agents or monomers may be chosen in particular from polyfunctional vinylaromatic compounds such as divinylbenzene and divinyltoluene, polyhydric alcohols such as ethylene glycol dimethacrylate and 1,3-butanediol diacrylate, trimethacrylates, allyl carboxylates such as allyl acrylate and allyl methacrylate, and di- and triallyl compounds such as diallyl phthalate, diallyl sebacate and triallyl triazine.

The particularly preferred polymers (A1) are butadiene homopolymer and butadiene-styrene copolymers. Advantageously, however, the polymer (A1) does not comprise styrene or other aromatic monomers with the exception of crosslinking agents.

Preferably, the polymer (A1) has a glass transition temperature Tg of between −100° C. and 10° C., advantageously between −80° C. and 0° C. and more preferably between −70° C. and −20° C.

The weight proportion of the polymer (A1) in the core (A) relative to finished core-shell polymer is at least 60%, preferably at least 70% and more preferably at least 75% by weight. The core (A) may also comprise the polymer (A1) as the only polymer component.

The polymer (B1) and the shell (B) is preferably a (meth)acrylic homopolymer or copolymer. Particularly preferred is a polymer comprising at least 70% by weight of monomers chosen from C1 to C12 alkyl (meth)acrylates, in particular a polymer comprising at least 80% by weight of C1 to C4 alkyl (meth)acrylates and/or C1 to C8 alkyl acrylates. Particularly preferred is a polymer derived from monomers chosen from methyl acrylate, ethyl acrylate, butyl acrylate, methyl methacrylate, ethyl methacrylate, butyl methacrylate and mixtures thereof.

The polymer (B1) may furthermore comprise repeating units derived from functional monomers chosen from glycidyl (meth)acrylate, acrylic or methacrylic acid, amides derived from these acids such as dimethylacrylamide, 2-methoxyethyl acrylate or methacrylate, 2-aminoethyl acrylate or methacrylate and mixtures thereof.

The polymer (B1) may be crosslinked. The crosslinking agents or monomers may be chosen in particular from polyfunctional vinylaromatic compounds such as divinylbenzene and divinyltoluene, polyhydric alcohols such as ethylene glycol dimethacrylate and 1,3-butanediol diacrylate, trimethacrylates, allyl carboxylates such as allyl acrylate and allyl methacrylate, and di- and triallyl compounds such as diallyl phthalate, diallyl sebacate and triallyl triazine.

The particularly preferred polymers (B1) comprise at least 70% by weight of repeating units derived from methyl methacrylate. According to a preferred embodiment, the polymer (B1) does not comprise styrene or other aromatic monomers with the exception of crosslinking agents.

Preferably, the polymer (B1) has a glass transition temperature Tg of between 60° C. and 150° C., advantageously between 80° C. and 150° C., more preferably between 90° C. and 150° C. and very particularly between 100° C. and 150° C.

The weight proportion of the polymer (B1) in the shell (B) relative to finished core-shell polymer is preferably from 5% to 30% by weight. The weight proportion of the shell (B) relative to finished core-shell polymer is advantageously at least 5% by weight, preferably at least 6% and more preferably at least 7% by weight.

Preferably, the polymer (B1) is grafted onto the polymer prepared in the preceding step, in particular the polymer A1, in the case where the core/shell particles only have two distinct parts.

Suitable polymers in the form of core-shell particles are commercially available, for example under the name Clearstrength® E 950 from the company Arkema France.

Polyether Block and Polyamide Block Copolymer (PEBA)

The composition according to the invention comprises, as impact modifier, in addition to the polymer in the form of core/shell particles, at least one polyether block and polyamide block copolymer (PEBA).

In order to optimize the transparency of the composition, the block copolymer has particular characteristics.

Firstly, the polyether block and polyamide block copolymer is transparent in the sense that it has, as a 2 mm layer, a transmittance at 560 nm of 90% or more.

Next, the PEBA preferably has a refractive index similar to the amorphous polyamide. Preferably, the refractive index of this component does not differ from that of the amorphous polyamide by more than 0.01, and more preferably 0.005 and very particularly 0.002.

Preferably, it is also amorphous, that is to say that its enthalpy of fusion is at most equal to 30 J/g, the mass being relative to the amount of amide units contained in the copolymer, this fusion corresponding to that of the amide units. Such amorphous polyether block and polyamide block copolymers are described for example in patent application WO 2008/006987, page 5, line 19 to page 9, line 35.

The polyether block and polyamide block copolymers result from the polycondensation of polyamide blocks having reactive ends with polyether blocks having reactive ends. It is thus possible to obtain PEBAs by reaction of:

1) polyamide blocks having diamine chain ends with polyoxyalkylene blocks having dicarboxylic chain ends;
2) polyamide blocks having dicarboxylic chain ends with polyoxyalkylene blocks having diamine chain ends; and
3) polyamide blocks having dicarboxylic chain ends with polyetherdiols, the products obtained then being referred to as polyetheresteramides.

The polyamide blocks advantageously represent 20% to 90% by weight, preferably from 40% to 80% by weight, more preferably from 60% to 80% by weight, with regard to the total weight of the copolymer.

The number-average molar mass Mn of the polyamide blocks is preferably between 400 and 20000 g/mol and in particular between 500 and 12000 g/mol, and very particularly between 2000 and 6000 g/mol.

The polymers containing polyamide blocks and polyether blocks may also comprise randomly distributed units.

Three types of polyamide blocks may advantageously be used.

According to a first type, the polyamide blocks originate from the condensation of a dicarboxylic acid, in particular those containing from 4 to 20 carbon atoms, preferably those containing from 6 to 18 carbon atoms, and of an aliphatic or arylaliphatic diamine, in particular those containing from 2 to 20 carbon atoms, preferably those containing from 6 to 14 carbon atoms.

As examples of dicarboxylic acids, mention may be made of 1,4-cyclohexyldicarboxylic acid, 1,2-cyclohexyldicarboxylic acid, 1,4-butanedioic acid, adipic acid, azelaic acid, suberic acid, sebacic acid, 1,12-dodecanedicarboxylic acid, 1,14-tetradecanedicarboxylic acid, 1,18-octadecanedicarboxylic acid, terephthalic acid and isophthalic acid, naphthalenedicarboxylic acid but also dimerized fatty acids.

As examples of diamines, mention may be made of 1,5-tetramethylenediamine, 1,6-hexamethylenediamine, 1,10-decamethylenediamine, 1,12-dodecamethylenediamine, trimethyl-1,6-hexamethylenediamine, 2-methyl-1,5-pentamethylenediamine, the isomers of bis(3-methyl-4-aminocyclohexyl)methane (BMACM), and 2,2-bis(3-methyl-4-aminocyclohexyl)propane (BMACP), and bis(p- aminocyclohexyl)methane (PACM) and isophoronediamine (IPD), 2,6-bis(aminomethyl)norbornane (BAMN) and piperazine (Pip), and meta-xylylenediamine (MXD), and para-xylylenediamine (PXD). Advantageously, just one cycloaliphatic diamine, in particular BMACM, is used as diamine.

At least one non-cycloaliphatic diamine may also be included in the composition of the monomers of the amide units, preferably at an amount of at most 30 mol % relative to the total of the diamines. As non-cycloaliphatic diamine, mention may be made of linear aliphatic diamines such as 1,4-tetramethylenediamine, 1,6-hexamethylenediamine, 1,9-nonamethylenediamine and 1,10-decamethylenediamine.

The aliphatic dicarboxylic acid(s) may preferably be selected from aliphatic dicarboxylic acids, in particular which are linear, having from 6 to 36 carbon atoms, preferably from 9 to 18 carbon atoms, in particular 1,10-decanedicarboxylic acid (sebacic acid), 1,12-dodecanedicarboxylic acid, 1,14-tetradecanedicarboxylic acid and 1,18-octadecanedicarboxylic acid.

At least one non-aliphatic dicarboxylic acid may be included in the composition of the monomers of the amide units, preferably at an amount of at most 15 mol % relative to the total of the dicarboxylic acids. The non-aliphatic dicarboxylic acid is preferably selected from aromatic diacids, in particular isophthalic acid (I), terephthalic acid (T), and mixtures thereof.

One or more monomers may be included in a minor amount in the preparation of the amide units. They may especially be selected from lactams and $\alpha,\omega$-aminocarboxylic acids.

The lactam is for example selected from caprolactam, oenantholactam and lauryllactam.

The $\alpha,\omega$-aminocarboxylic acid is for example selected from aminocaproic acid, 7-aminoheptanoic acid, 11-aminoundecanoic acid or 12-aminododecanoic acid.

Advantageously, the number of carbons per amide in the polyamide blocks is on average at least equal to 9.

The polyamide blocks are preferably selected from PA B6, PA B9, PA B10, PA B12, PA B14, PA B16 or PA B18 blocks and mixtures thereof.

Advantageously, such polyamide blocks are chosen from the following: PA 412, PA 414, PA 418, PA 610, PA 612, PA 614, PA 618, PA 912, PA 1010, PA 1012, PA 1014, PA 1018, PA MXD6, PA PXD6, PA MXD10, PA PXD10, PA B6, PA B9, PA B10, PA B12, PA B14, PA B16, PA B18 and mixtures thereof.

It should be noted that in the notation PA XY, X represents the number of carbon atoms derived from the diamine residues and Y represents the number of carbon atoms derived from the diacid residues (conventionally), when these are numbers. The letter B represents the residue derived from the diamine BMACM, MXD represents the residue derived from m-xylylenediamine and PXD represents the residue derived from p-xylylenediamine.

According to a second type, the polyamide blocks result from the condensation of one or more $\alpha,\omega$-aminocarboxylic acids and/or of one or more lactams containing from 6 to 12 carbon atoms in the presence of a dicarboxylic acid containing from 4 to 12 carbon atoms or of a diamine. As examples of lactams, mention may be made of caprolactam, oenantholactam and lauryllactam. As examples of $\alpha,\omega$-aminocarboxylic acids, mention may be made of aminocaproic acid, 7-aminoheptanoic acid, 11-aminoundecanoic acid and 12-aminododecanoic acid.

Advantageously, the polyamide blocks of the second type are made of polyamide 11, polyamide 12 or polyamide 6.

According to a third type, the polyamide blocks result from the condensation of at least one $\alpha,\omega$-aminocarboxylic acid (or a lactam), at least one diamine and at least one dicarboxylic acid. In this case, the polyamide blocks are prepared by polycondensation:

of the linear aliphatic or aromatic diamine(s) containing X carbon atoms;

of the dicarboxylic acid(s) containing Y carbon atoms; and of the comonomer(s) {Z}, chosen from lactams and $\alpha,\omega$-aminocarboxylic acids containing Z carbon atoms and equimolar mixtures of at least one diamine containing X1 carbon atoms and of at least one dicarboxylic acid containing Y1 carbon atoms, (X1, Y1) being different from (X, Y);

said comonomer(s) {Z} being introduced in a weight proportion ranging up to 50%, preferably up to 20%, even more advantageously up to 10% relative to the total amount of polyamide-precursor monomers;

in the presence of a chain limiter chosen from dicarboxylic acids.

Advantageously, the dicarboxylic acid containing Y carbon atoms is used as chain limiter, which is introduced in excess relative to the stoichiometry of the diamine(s).

According to one variant of this third type, the polyamide blocks result from the condensation of at least two $\alpha,\omega$-aminocarboxylic acids or of at least two lactams containing from 6 to 12 carbon atoms or of one lactam and one $\alpha,\omega$-aminocarboxylic acid not having the same number of carbon atoms, in the optional presence of a chain limiter. As aliphatic $\alpha,\omega$-aminocarboxylic acid, mention may be made of aminocaproic acid, 7-aminoheptanoic acid, 11-aminoundecanoic acid and 12-aminododecanoic acid. As lactam, mention may be made of caprolactam, oenantholactam and lauryllactam. As aliphatic diamines, mention may be made of hexamethylenediamine, dodecamethylenediamine and trimethylhexamethylenediamine. An example of a cycloaliphatic diacid that may be mentioned is 1,4-cyclohexyldicarboxylic acid. As aliphatic diacids, mention may be made of butanedioic acid, adipic acid, azelaic acid, suberic acid, sebacic acid, dodecanedicarboxylic acid, dimerized fatty acids (these dimerized fatty acids preferably have a dimer content of at least 98%; they are preferably hydrogenated; they are sold under the brand name Pripol® by the company Unichema, or under the brand name Empol® by the company Henkel) and polyoxyalkylene-$\alpha,\omega$-diacids. As examples of aromatic diacids, mention may be made of terephthalic acid (T) and isophthalic acid (I). As examples of cycloaliphatic diamines, mention may be made of the isomers of bis(3-methyl-4-aminocyclohexyl)methane (BMACM or B), and 2,2-bis(3-methyl-4-aminocyclohexyl) propane (BMACP) and bis(p-aminocyclohexyl)methane (PACM or P). The other diamines commonly used may be isophoronediamine (IPD), 2,6-bis(aminomethyl)norbornane (BAMN) and piperazine. As examples of arylaliphatic diamines, mention may be made of meta-xylylenediamine (MXD) and para-xylylenediamine (PXD).

Particularly preferred as polyamide blocks of the third type are 6.6/6 and 6.6/6.10/11/12.

The polyether blocks advantageously represent 10% to 80% by weight, preferably from 20% to 60% by weight, more preferably from 20% to 40% by weight, with regard to the total weight of the copolymer. The number-average molecular weight of the PE blocks is advantageously between 200 and 4000 g/mol, preferably between 300 and 1100 g/mol.

The number-average molecular weight of the polyether blocks may be between 200 and 1000 g/mol, preferably within the range from 400 to 800 g/mol, preferably from 500 to 700 g/mol.

The polyether blocks may be derived from at least one polyalkylene ether polyol, in particular a polyalkylene ether diol, preferably chosen from polyethylene glycol (PEG), polypropylene glycol (PPG), polytrimethylene glycol (PO3G), polytetramethylene glycol (PTMG), and mixtures thereof or copolymers thereof. The polyether blocks may comprise polyoxyalkylene sequences with amine chain ends, such sequences being able to be obtained by cyanoacetylation of aliphatic α,ω-dihydroxylated polyoxyalkylene sequences, referred to as polyether diols. More particularly, use may be made of Jeffamines (for example Jeffamine® D400, D2000, ED 2003, XTJ 542, sold by the company Huntsman). Reference is made in this regard to documents JP 2004346274, JP 2004352794 and EP 1482011. Preferably, the polyether blocks comprise or consist of polytetramethylene glycol (PTMG).

In these copolymers, the polyamide blocks preferably comprise more than 50 mol % of an equimolar combination of at least one cycloaliphatic diamine and of at least one aliphatic dicarboxylic acid. Preferably, the aliphatic dicarboxylic acid is more than 50 mol %, preferably more than 70%, in particular more than 80%, and in particular more than 90% and very particularly 100% linear, having 8 to 36, preferably 8 to 16 carbon atoms. Indeed, such polyamide blocks contribute to a high transmittance of the copolymer.

These copolymers may be prepared for example by the process according to which:
  in a first step, the polyamide blocks are prepared by polycondensation
    of the diamine(s);
    of the dicarboxylic acid(s); and
    where appropriate, of the comonomer(s) selected from lactams and α,ω-aminocarboxylic acids;
    in the presence of a chain limiter selected from dicarboxylic acids; then
  in a second step, the polyamide blocks obtained are reacted with polyether blocks, in the presence of a catalyst.

The general two-step preparation method for the copolymers of the invention is known and described, for example, in documents FR 2846332 and EP 1482011.

The reaction for forming the polyamide block may especially be carried out at a temperature from 180° C. to 300° C., preferably from 200° C. to 290° C. The pressure in the reactor is preferably set at between 5 and 30 bar and preferably maintained for approximately 2 to 3 hours. It is then possible to slowly reduce the pressure of the reactor to atmospheric pressure and then distill off the excess water, for example over one or two hours.

Once the polyamide block bearing carboxylic acid ends has been prepared, the PE block and a catalyst may then be added. The polyether block may be added in one or more portions, as may the catalyst. According to an advantageous form, the polyether block is first added; the reaction of the OH ends of the PE block and of the COOH ends of the polyamide block begins with the formation of ester bonds and the elimination of water. As much water as possible is eliminated from the reaction medium by distillation and the catalyst is then introduced to complete the bonding of the polyamide blocks and the polyether blocks. This second step may be carried out with stirring, preferably under a vacuum of at least 15 mmHg (2000 Pa) at a temperature such that the reagents and the copolymers obtained are in the molten state.

By way of example, this temperature may be between 100° C. and 400° C. and usually between 200° C. and 300° C. The reaction is monitored by measuring the torque exerted by the molten polymer on the stirrer or by measuring the electrical power consumed by the stirrer. The end of the reaction is determined by the target torque or power value.

It is also possible to add, during synthesis, at the moment deemed to be the most opportune, one or more molecules used as antioxidant, for example the commercial products Irganox® 1010 or Irganox® 245.

It also possible to carry out a process for preparing these copolymers in which all the monomers are brought together from the start, i.e. in a single step, to carry out the polycondensation:
  of the diamine(s);
  of the dicarboxylic acid(s); and
  where appropriate, of the other polyamide comonomer(s);
    in the presence of a chain limiter selected from dicarboxylic acids;
    in the presence of the polyether blocks; and
    in the presence of a catalyst for catalyzing the reaction between the polyether blocks and the polyamide blocks.

Advantageously, said dicarboxylic acid is used as chain limiter, introduced in excess relative to the stoichiometry of the diamine(s).

Advantageously, a derivative of a metal selected from the group formed of titanium, zirconium and hafnium, or a strong acid such as phosphoric acid, hypophosphorous acid or boric acid, is used as catalyst.

The polycondensation may especially be carried out at a temperature from 240 to 280° C.

The copolymers may comprise hydrophilic polyether blocks, preferably polyether blocks of PEG, PPG or PO3G type, which provides an extra advantage in terms of antistatic and waterproof/breathable (that is to say, allowing the passage of water vapor but not of liquid water) properties to the composition.

According to another particularly preferred embodiment, the copolymer is a copolymer containing B.12 blocks and containing PTMG blocks.

According to the invention, the polymer composition comprises from 1% to 15%, preferably from 2% to 10% and in particular from 3% to 7% by weight of PEBA relative to the total weight of the composition.

Advantageously, the composition according to the invention does not contain other polymers, and in particular no polyamides other than those mentioned.

It may nevertheless optionally comprise 0 to 10% by weight, preferably 1% to 8% and in particular 2% to 5% by weight of usual additives, such as coloring agents, pigments, dyes, UV stabilizers, anti-aging agents, antioxidants, fluidizing agents, anti-abrasion agents, mold-release agents, stabilizers, plasticizers, surfactants, brighteners, fillers, fibers, waxes, optionally as a mixture.

According to a particularly preferred embodiment, the polyamide-based polymer composition consists of:
  a) 50% to 98% by weight of a transparent amorphous polyamide;
  b) 1% to 15% by weight of a polymer in the form of core-shell particles; and
  c) 1% to 15% by weight of a polyether block and polyamide block copolymer; and
  d) 0 to 10% by weight of additives,
the respective proportions of the components a), b), c) and d) adding up to 100%.

In order to adjust the refractive index if necessary, it is possible to act on the nature of the raw materials used to synthesize the PEBA and the polyamide. Generally, an aromatic compound (for example an aromatic diacid) will increase the refractive index of a product. For PEBAs, the refractive index decreases if the content of polyether is increased, relative to the pure polyamide of the same composition as the polyamide block of the PEBA. In the series of polyamides of BMACM.Y type, Y being an aliphatic diacid, the index decreases with the chain length of Y. In general, for a linear aliphatic polyamide, the refractive index decreases with the chain length.

Manufacture of the Composition

The composition according to the invention may be obtained easily by means of the usual methods.

In particular, it can be obtained by compounding the polymer ingredients in the melt state, for example in a twin-screw extruder. The ingredients are then advantageously introduced using gravimetric metering devices.

Use of the Composition

The composition according to the invention can be used to manufacture granules or powders, which can in turn be used in conventional polymer shaping processes for the manufacture of filaments, tubes, films, sheets and/or objects that are molded, transparent and impact resistant.

For the process for manufacturing objects, in particular molded, injection-molded or extruded objects according to the invention, granules are preferred. Less frequently, use is made of powders having an average diameter as determined by a laser diffraction particle size analyzer in the range 400 to 600 µm. According to a particular shaping method of the process of the invention, in particular by sintering such as "laser sintering" or else by rotational molding, the compositions according to the invention are preferably in the form of a powder, the particles of which have a volume median diameter of less than 400 µm, preferably less than 200 µm. Among the powder manufacturing methods, mention may be made of cryogenic milling and microgranulation.

Said composition can be used according to the invention to manufacture granules or powders, which can in turn be used in conventional polymer shaping processes for the manufacture of filaments, tubes, films, sheets and/or objects that are molded and transparent. The shaping processes envisaged may in particular be molding, injection molding, extrusion, coextrusion, hot pressing, multimaterial injection molding, rotational molding, sintering or laser sintering.

The composition according to the invention makes it possible to obtain an object having improved impact strength without significant loss in terms of transparency or stiffness, as demonstrated in the tables of the examples below.

The invention will be explained in more detail in the examples which follow.

EXAMPLES

Examples 1 to 4

An amorphous polyamide (Rilsan G850 sold by Arkema France), a polymer in the form of core/shell particles (MBS E950 sold by Arkema France), and a polyether block and polyamide block copolymer (PEBAX MX1971 sold by Arkema France) were introduced into a twin-screw extruder in the proportions specified in table 1 below. A homogeneous composition was obtained by compounding the ingredients at a temperature of 260° C.

TABLE 1

Composition of the polymer compositions

| Ingredients | Example 1 | Example 2 | Example 3 | Example 4 | Comparative example 1 | Comparative example 2 |
|---|---|---|---|---|---|---|
| Amorphous polyamide [% by weight] | 94 | 90 | 88 | 84 | 95 | 90 |
| Core/shell polymer [% by weight] | 3 | 5 | 5.5 | 8 | 5 | 10 |
| Polyether block and polyamide block copolymer [% by weight] | 3 | 5 | 5.5 | 8 | — | — |

In order to evaluate the properties of the compositions prepared, the impact resilience was measured at ambient temperature (23° C.) and at low temperature (−30° C.) according to the protocol indicated in the standard ISO 179-1/1 eA.

Furthermore, the transparency of the compositions was evaluated by measuring the transmittance at 560 nm and the haze value on molded plates having a thickness of 2 mm, according to the ISO 13468-2:2006 standard.

TABLE 2

Optical and mechanical properties of the polymer compositions

| Examples | Transmittance at 560 nm, thickness 2 mm [%] | Haze, thickness 2 mm [%] | Impact strength at 23° C. [kJ/m$^2$] | Impact strength at −30° C. [kJ/m$^2$] | Flexural modulus [MPa] |
|---|---|---|---|---|---|
| Example 1 | 90.7 | 2.7 | 26.4 100% breakage | 13.2 | 1585 |
| Example 2 | 89.7 | 4.6 | >60 100% partial breakage | 17.4 | 1515 |
| Example 3 | 89.7 | 4.3 | >60 100% partial breakage | 18.0 | 1500 |
| Example 4 | 88.6 | 5.8 | >60 100% partial breakage | 24.0 | 1430 |
| Comparative example 1 | 88.9 | 4.6 | 25 100% breakage | 13 | 1600 |
| Comparative example 2 | 87.3 | 8.9 | 35 100% breakage | 21 | 1530 |

All the results demonstrate that the composition according to the invention, in which an amorphous polyamide is modified with an appropriate PEBA and a polymer in the form of core/shell particles in combination, makes it possible to improve the impact strength while maintaining the transparency in terms of transmittance and haze value.

The study of various formulations compared to the known compositions reveals a favorable effect of this combination. Specifically, the modified compositions have a transmittance higher than that of the compositions of the comparative examples which are devoid of core/shell particles.

Finally, it was verified that the compositions have a haze value that is comparable, or even lower than those observed for the compositions of the comparative examples.

LIST OF THE DOCUMENTS CITED

EP3215568A1
FR 2 965 269 A1

The invention claimed is:

1. A polyamide-based polymer composition comprising:
   a) 50% to 98% by weight of polyamide consisting of transparent amorphous polyamide;
   b) 1% to 15% by weight of a polymer in the form of core-shell particles; and
   c) 1% to 15% by weight of a polyether block and polyamide block copolymer,
   wherein said polyether block and polyamide block copolymer has:
      as a 2 mm layer, a transmittance at 560 nm of 90% or more and
      a refractive index that does not differ by more than 0.01 from that of the transparent amorphous polyamide,
   and wherein the polymer in the form of core-shell particles has a refractive index that does not differ by more than 0.01 from that of the transparent amorphous polyamide.

2. The polymer composition as claimed in claim 1, wherein the polymer in the form of core-shell particles comprises no more than 10 mol % of aromatic monomers.

3. The polymer composition as claimed in claim 1, wherein the transparent amorphous polyamide is chosen from TMDT, TMDI, TMD18, TMD14, TMD12, TMD10, MPMDT, MPMDI, MPMD18, MPMD14, MPMD12, MPDM10, B10, B11, B12, B13, B14, B16, B18, B19, B20, B21, BI, P10, P11, P12, P13, P14, P16, P18, P19, P20, PI, P21, 11/BI, 11/BT, 12/BI, 12/BT, 11/B10, 12/B10, 11/P10, 12/P10, 11/B12, 12/B12, 11/P12, 12/P12, 11/B14, 12/B14, 11/P14, 12/P14, 11/B18, 12/B18, 11/P18, 12/P18, 6.10/BI, 6.10/BT, 10.10/BI, 10.10/BT, 6.12/BI, 612/BI, 1012/BI, 1012/BT, 610/PI, 610/PT, 1010/PI, 1010/PT, 612/PI, 612/PT, 1012/PI, 1012/PT, 610/B10, 610/B12, 610/B14, 610/B18, 1010/B10, 1010/B12, 1010/B14, 1010/B18, 1012/B10, 1012/B12, 1012/B14, 1012/B18, 610/P10, 610/P12, 610/P14, 610/P18, 1010/P10, 1010/P12, 1010/P14, 1010/P18, 1012/P10, 1012/P12, 1012/P14, 1012/P18, B10/P10, B12/P12, B14/P14 12/B I/BT, 11/BI/BT, 12/PI/PT, 11/P I/PT, 11/B10/BT, 11/B12/BT, 11/P10/PT, 12/B10/BI, 12/B12/BI, 12/P10/PI, 12/P12/PI, 12/B10/BT, 12/B12/BT, 12/P10/PT, 12/P12/PT, 11/B10/BI, 11/B12/BI, 11/P10/PI, 11/P12/PI, 11/P12/PT, 11/B10/B14, 11/P10/P14, 11/B12/B14, 11/P12/P14, 12/B10/B14, 12/P10/P14, 12/B12/B.4, 12/P12/P14, 11/B10/B12, 11/P10/P12, 12/B10/B12, 12/P10/P12, 11/P12/B12, 12/P12/B12, 11/P10/B10, 12/P10/B10, 12/BI, 12/BT, B12, 11/B14 and 11/B10 polyamides.

4. The polymer composition as claimed in claim 1, wherein the transparent amorphous polyamide is PA 11/B10.

5. The polymer composition as claimed in claim 4, wherein the molar ratio of the number of moles of aminoundecanoic acid to the number of moles of diamine forming the polyamide in the transparent amorphous polyamide is between 0.01 and 0.5.

6. The polymer composition as claimed claim 1, wherein the polymer in the form of core-shell particles comprises a layer (A) comprising a polymer (A1) having a glass transition temperature $Tg_{A1}$ below 0° C. and a layer (B) comprising a polymer (B1) having a glass transition temperature $Tg_{B1}$ above 60° C.

7. The polymer composition as claimed in claim 6, wherein the polymer (B1) is a (meth)acrylic polymer.

8. The polymer composition as claimed in claim 6, wherein the polymer (B1) comprises at least 80% by weight of C1 to C4 alkyl methacrylate monomers and/or of C1 to C8 alkyl acrylate monomers.

9. A process for manufacturing a polyamide-based polymer composition as defined in claim 1, comprising the step of mixing
   a) 50% to 98% by weight of a transparent amorphous polyamide;
   b) 1% to 15% by weight of a polymer in the form of core-shell particles; and
   c) 1% to 15% by weight of a polyether and polyamide block copolymer,
   wherein said polyether and polyamide block copolymer has:
      as a 2 mm layer, a transmittance at 560 nm of 90% or more and
      a refractive index that differs by 0.01 or less from that of the transparent amorphous polyamide, and
   wherein the polymer in the form of core-shell particles has a refractive index that does not differ by more than 0.01 from that of the transparent amorphous polyamide.

10. The polymer composition obtained by the process as claimed in claim 9.

11. An article comprising a composition as claimed in claim 1 in at least one part or one layer.

12. The article as claimed in claim 11, wherein the article is a molded object, a sheet, a profiled element, a tube, a hollow body or an optically variable filter or an optical lens, optical recording systems, flowmeters, rupture disks, screens, optical data storage, housings or parts of housings, a decorative element or a structural element, a part of a sports shoe, or golf equipment, or a cover, a part of electronic equipment, storage media, infrared keys, portable recording devices, personal digital assistants, smartphones, a coating, sports equipment, or a veneer.

* * * * *